United States Patent [19]

Itoh

[11] 4,426,668
[45] Jan. 17, 1984

[54] HIGH-SPEED TAPE TRANSPORT SYSTEM

[75] Inventor: Kenji Itoh, Yokohama, Japan

[73] Assignees: Victor Company of Japan, Ltd., Yokohama, Japan

[21] Appl. No.: 269,887

[22] Filed: Jun. 3, 1981

[30] Foreign Application Priority Data

Jun. 3, 1980 [JP] Japan .................................. 55-74526

[51] Int. Cl.³ ...................... G11B 15/46; G11B 19/28; G11B 21/04; G03B 1/04
[52] U.S. Cl. ........................................ 360/73; 360/70; 242/204
[58] Field of Search .................... 360/73, 71, 72.2, 90, 360/10, 74.2, 70, 33; 242/204; 318/314

[56] References Cited

U.S. PATENT DOCUMENTS

| 3,596,005 | 7/1971 | Hamilton. | |
|---|---|---|---|
| 4,196,875 | 4/1980 | Tatekawa | 360/73 |
| 4,261,020 | 4/1981 | Beeson | 360/73 |
| 4,296,446 | 10/1981 | Zorbalas | 360/10 |
| 4,318,140 | 3/1982 | Shigeta | 360/73 |
| 4,335,401 | 6/1982 | Zorbalas | 360/73 |
| 4,338,640 | 7/1982 | Yabu | 360/70 |
| 4,358,797 | 11/1982 | Nishijima | 360/70 |

Primary Examiner—Robert Martin Kilgore
Attorney, Agent, or Firm—Louis Bernat

[57] ABSTRACT

A high-speed tape transport system in a magnetic reproducing apparatus. The reproducing apparatus includes a reel for taking up a magnetic tape on which an information signal and a control signal have been recorded. The system comprises a control head for reproducing the control signal from the magnetic tape, a frequency-voltage converter for producing a voltage corresponding to the frequency or period of the control signal thus reproduced. Moreover, the system includes a reel motor for rotating the reel and a circuit for controlling the reel motor's rotational speed in response to the voltage produced by the frequency-voltage converter. Consequently, the rotational speed of the reel motor is controlled so that the magnetic tape is travelled at a constant high speed.

6 Claims, 3 Drawing Figures

HIGH-SPEED TAPE TRANSPORT SYSTEM

BACKGROUND OF THE INVENTION

The present invention relates to a high-speed tape transport system in a magnetic reproducing apparatus and more particularly to a system which controls the rotation of a reel motor for a reel so that the speed of the high-speed travel of a magnetic tape traveling by being taken up on that reel in an apparatus for magnetic recording/reproducing of video signals becomes constant.

Heretofore, in an apparatus for magnetically recording and reproducing video signals on a magnetic tape (hereinafter referened to as VTR), there has been a system which, as it causes the magnetic tape to travel in the forward direction or the reverse direction at a high speed of the order of 10 times the traveling speed at the time of normal recording or reproducing, reproduces the recorded signals, and, as the operator observes the high-speed reproduced picture, a desired recording position on the magnetic tape is sought out in a short time, that is, a system for carrying out a so-called high-speed search reproduction.

For feeding the magnetic tape at high speed in order to accomplish this high-speed search reproduction, there has been a method in which the capstan is rotated at a high speed of approximately 10 times that during ordinary recording and reproducing, and the magnetic tape is driven by this capstan to travel at the high speed. In addition, there has been a method in which the reel on the side taking up the magnetic tape (i.e., the take-up reel at the time of forward travel and the supply reel at the time of reverse travel) is caused to rotate at high speed.

However, by the former method in which the magnetic tape is driven to travel at high speed by rotating the capstan at high speed, since the capstan is rotated at a high speed of approximately 10 times its speed at the time or ordinary recording and reproducing, a voltage which is greatly higher than the applied voltage at the time of ordinary recording and reproducing must be applied to the capstan motor. For this reason, a great load is imposed on the capstan motor, which is thereby used under an unreasonably severe condition, whereby the serviceable life of the capstan motor is shortened. This has been a problem in the prior art.

Furthermore, there has also been a method in which, by the use of a speed-changing mechanism employing gears, rotational output of a great speed variation range is obtained without changing the rotation of the capstan to a great extent. This method, however, has been accompanied by problems such as increase in the cost of the apparatus and in the required space for installation due to the use of the speed-change mechanism and, moreover, instability of the tape travel which gives rise to wow and flutter.

On the other hand, by the latter known method in which the reels are rotated at high speed, a constant driving voltage has been applied to the reel motor for driving the winding-up reel. For this reason, as the magnetic tape travels and is taken up on the reel, the diameter of the roll of the magnetic tape already wound around the reel varies. As a consequence, the load on the reel motor changes, whereby the traveling speed of the magnetic tape is not constant. Consequently, satisfactory search reproduction cannot be carried out. For example, in the case where a reproduced signal is a color video signal, degradation of color is caused in the reproduced picture by time base fluctuation which cannot be corrected by the chrominance signal processing circuit of the reproducing system.

SUMMARY OF THE INVENTION

Accordingly, it is a general object of the present invention to provide a novel and useful high-speed tape transport system in a magnetic reproducing apparatus in which system the above described problems have been overcome.

Another and specific object of the invention is to provide a system which detects the period of a control signal reproduced from a magnetic tape, controls the rotation of a reel motor so that this period will become constant, and thus carries out high-speed reproduction. By the use of the system of the present invention, no excessive load whatsoever is imposed on the capstan motor, and the magnetic tape can be caused to travel stably at a constant high speed. Accordingly, a good reproduced picture is obtained, whereby high-speed search reproduction can be carried out.

Other objects and further features of the invention will be apparent from the following detailed description with respect to a preferred embodiment of the invention when read in conjunction with the accompanying drawings.

DETAILED DESCRIPTION

Figure 1:
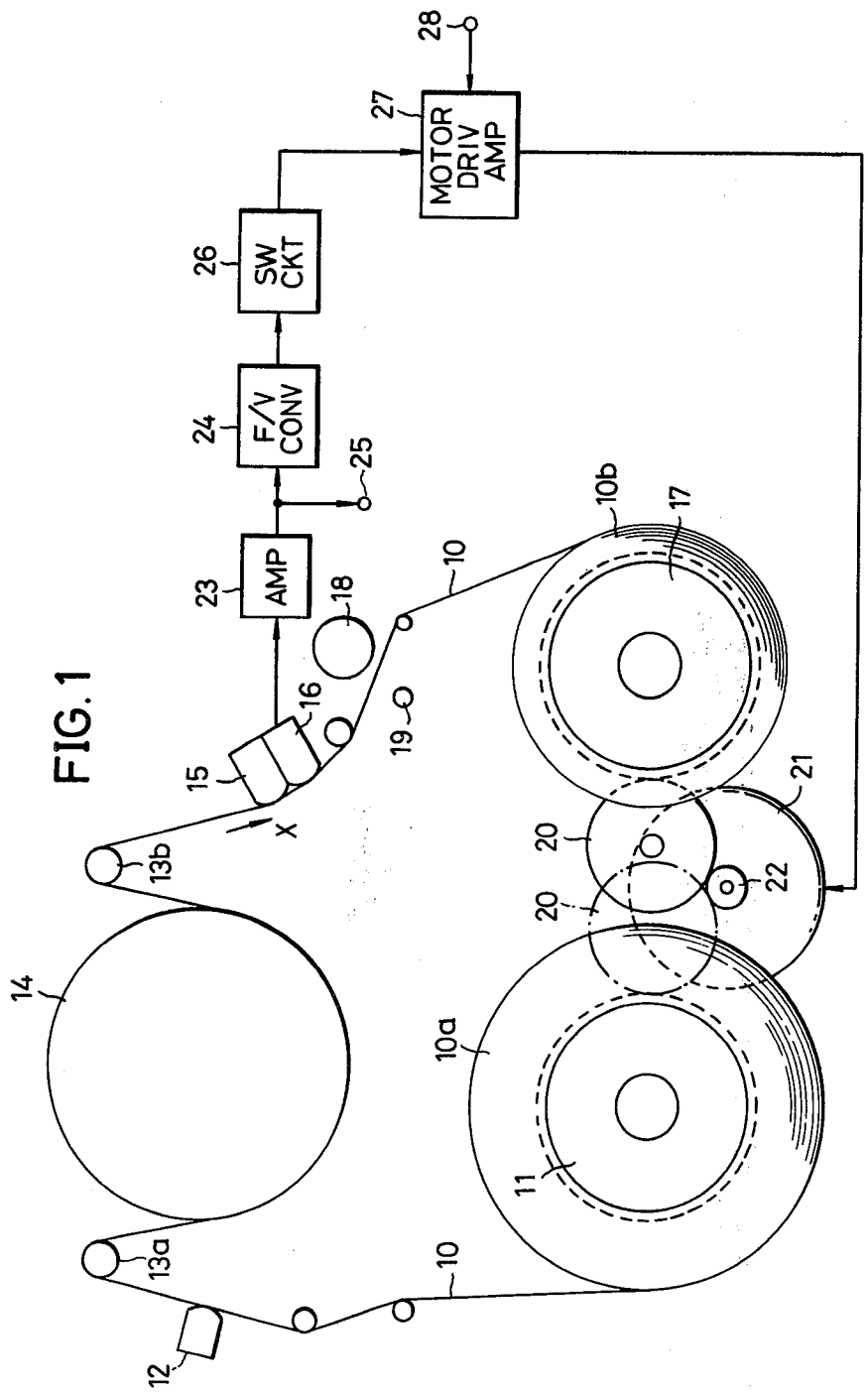
FIG. 1 is a block system diagram of one embodiment of the high-speed tape transport system according to the present invention combined with a schematic diagram of the essential parts of one example of a magnetic recording and reproducing apparatus.

In the apparatus illustrated in FIG. 1, a magnetic tape 10 is played out from a tape roll 10a wound around a reel disc 11 on the supply side and, after wrappingly contacting a full erasing head 12, is wrapped and travels around a guide drum 14 over a wrapping region determined by a pair of guide poles 13a and 13b. The guide drum 14 comprises a rotary upper drum having, for example, a pair of video heads and a fixed lower drum. The tape 10 further contacts an erasing head 15 and an audio and control head (hereinafter referred to as the control head) 16 and is thereafter taken up on a tape roll 10b on a reel disc 17 on the take-up side. At the time of high-speed search reproduction, a pinch roller 18, which normally operates cooperatively with a capstan 19 during ordinary reproduction, is retracted apart from the capstan and is in an inoperative position.

Between the reel disc 11 on the supply side and the reel disc 17 on the take-up side, there is provided an idler 20 which, at the time of forward search reproduction, is in the position indicated by solid line and is then in contact with a wheel 22 fixedly mounted on the rotor shaft of a reel motor 21, which is a direct-current motor, and with the reel disc 17 on the take-up side. Accordingly, driving power from the reel motor 21 is transmitted through the idler 20 to the reel disc 17, which thereby rotates in the clockwise direction as viewed in FIG. 1 thereby to take up the tape 10. At the time of reverse direction search reproduction, the idler 20 is shifted by a lever (not shown) to the position indicated by one-dot chain line and is then in contact with the wheel 22 and the reel disc 11 on the supply side. At this time, the reel motor 21 is rotated in the reverse direction, whereby the reel disc 11 rotates in the counter-clockwise direction thereby to take up the tape 10 on the tape roll 10a.

As described hereinafter, the rotation of the reel motor 21 is so controlled that the tape 10 travels at constant speed even when the winding diameter, that is, the diameter of the tape roll 10a or 10b varies. For this reason, while the rotational speed of the reel motor 21 varies with the travel of the tape 10, the reel motor 21 is caused to rotate so that the reel disc 17 is rotated faster than the rotational speed for taking up the tape at the time of ordinary recording and reproducing.

As the tape 10 contacts and travels around the guide drum 14 at the time of ordinary recording, a video signal is recorded on the tape by video heads (by either the apparatus shown in FIG. 1 or a separate apparatus). Furthermore, the control head 16 senses control signals along a lateral edge of the tape 10. These control signals have been originally recorded for use in a rotation control servo of the rotary drum.

At the time of high-speed search reproduction, when the reel motor 21 is started, the reel disc 17 on the take-up side is rotated in the tape take-up direction. The tape 10 is thus taken up on this reel disc 17 and travels in the arrow direction X. As the tape 10 thus travels, the control signals are reproduced by the control head 16 from the tape 10. A control signal thus reproduced is amplified by an amplifier 23 and is thereafter supplied to a frequency-voltage converter (hereinafter referred to as an F/V converter) 24. At the same time, the reproduced control signal is led out through a terminal 25 and fed to a servo circuit (not shown) of the rotary drum.

Figure 3:
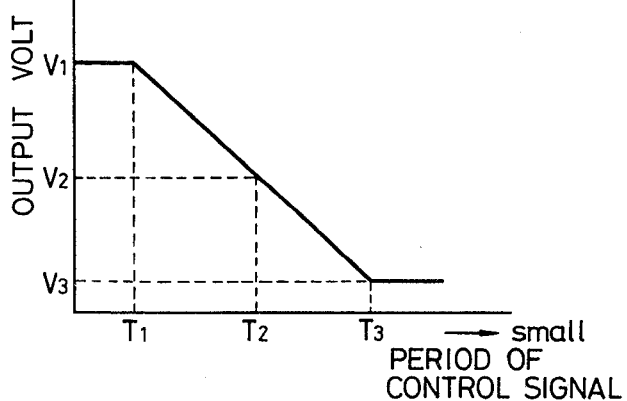
FIG. 3 is a graph indicating a characteristic of a frequency-voltage converter in the system shown in FIG. 1.

The F/V converter 24 may generate, for example, a voltage corresponding to the frequency (or period) of its input signal and has an input-output characteristic as indicated in FIG. 3. In FIG. 3, the abscissa represents the period of the reproduced control signal (input signal), while the ordinate represents the converted output voltage. As is apparent from this graph, the F/V converter 24 produces a maximum output voltage V1 when the period of the reproduced control signal is longer than (on the left side of, in FIG. 3) the period T1 and produces a minimum output voltage V3 when the control signal is shorter than (on the right side of, in FIG. 3) the period T3. Between the periods T1 and T3, the F/V converter 24 produces an output voltage varying linearly with the period.

Figure 2:
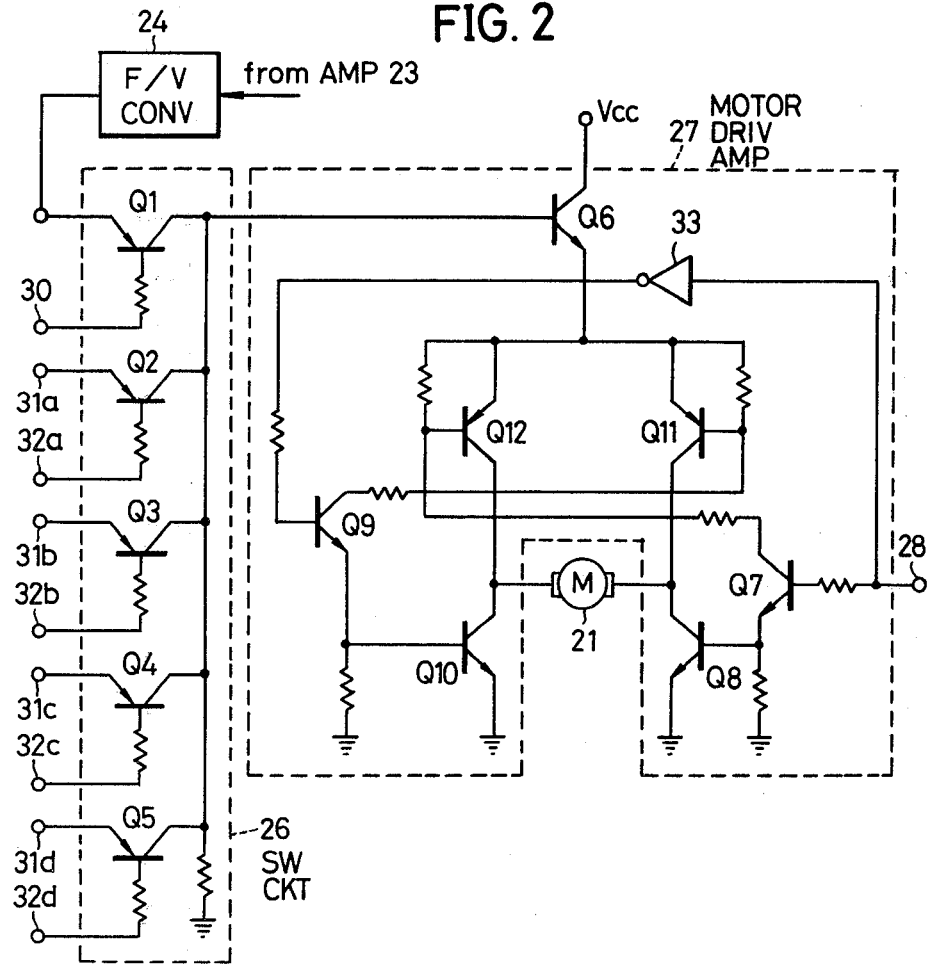
FIG. 2 is a specific circuit diagram of one part of the system shown in block form in FIG. 1.

The output of the F/V converter 24 is supplied via a switching circuit 26 to a motor drive amplifier 27. The switching circuit 26 comprises, for example, transistors Q1 through Q5 as shown in FIG. 2. The bases of these transistors are respectively connected to terminals 30 and 32a through 32d, of which the terminal corresponding to the operational mode is grounded. For example, at the time of high-speed search reproduction mode, the terminal 30 is grounded; at the time of ordinary play mode, the terminal 32a is grounded; at the time of fast forward mode, the terminal 32b is grounded; and so on. A transistor whose terminal is thus grounded assumes the "ON" or conductive state.

The emitter of the transistor Q1 is connected to the F/V converter 24. To the emitters of the transistors Q2 through Q5 are applied voltages respectively corresponding to the modes assigned to these transistors. Accordingly, through a transistor which has been turned "ON" in correspondence to its operational mode, a voltage in accordance with that operational mode is applied to the base of a transistor Q6 of the motor drive amplifier 27. Since the present invention is being described with respect to high-speed search reproduction, the output voltage of the F/V converter 24 is applied to the base of the transistor Q6. The internal resistance of the transistor Q6 varies in response to the voltage applied to its base.

On the other hand, a signal for designating the tape travel direction formed in response to the action of a control button of the recording and reproducing apparatus is applied to a terminal 28 of the motor drive amplifier 27. This designating signal is, for example, a signal of high level at the time of forward travel of the tape 10 and is a signal of low level at the time of reverse travel.

At the time of high-speed search reproduction in the forward direction, if a high-level signal is applied to the terminal 28, a transistor Q7 in the motor drive amplifier 27 assumes its "ON" state, and a transistor Q9, to which the signal is inverted by an inverter 33 is applied at a low level, assumes its "OFF" state. As a consequence, transistors Q8 and Q12 in the same motor drive amplifier 27 become "ON", and transistors Q10 and Q11 therein become "OFF". Consequently, from a direct-current power source Vcc, a current flows via the transistors Q6, Q12, and Q8 through the reel motor 21. A current corresponding to the voltage applied to the base of the transistor Q6 thereupon flows through the reel motor 21, which thereby rotates in the forward direction at a rotational speed corresponding to this current.

At the time of reverse direction high-speed search reproduction, a low-level signal is applied to the terminal 28, and, in a manner opposite to that described above, the transistors Q7, Q8, and Q12 become "OFF", while the transistors Q9, Q10, Q11 become "ON". A current thereupon flows by way of the transistors Q6, Q11, and Q10 through the reel motor 21, which then rotates in the reverse direction.

At the time of forward direction high-speed search reproduction, a high-level signal is applied to the terminal 28, and the reel motor 21 starts to rotate in the forward direction. At this time of start of the reel motor rotation, the period of the control signal reproduced by the control head 16 is greater than the specified regular period T1 since the tape 10 driven by the take-up reel disc 17 rotated by the reel motor 21 is starting to travel from its stopped state. For this reason, a maximum voltage is produced by the F/V converter 24 and is supplied to the motor drive amplifier 27. In response to this, the reel motor 21, with great starting torque, abruptly tends to reach high-speed rotation.

After the tape 10 has started to travel and while the period of the reproduced control signal is less than the regular period T1 but is greater than the operational point period T2, a voltage of a value between the maximum voltage V1 and the operational point voltage V2 is obtained from the F/V converter 24. As a result, the reel motor 21 is caused to operate toward a higher rotational speed than the normal speed at the operational point.

Then, when the reel motor 21 rotates faster than the normal rotational speed, the period of the control signal reproduced from the tape 10 becomes less (shorter) than the operational point period T2, and the output voltage of the F/V converter 24 becomes lower than the operational point voltage V2. Consequently, the rotational speed of the reel motor 21 is caused to rotate at a speed lower than the normal speed. When the rotational speed of the reel motor 21 becomes slower than the normal speed, the output voltage of the F/V converter 24 becomes higher than the operational point voltage V2, and the rotational speed of the reel motor 21 becomes high.

Similarly thereafter, as an ultimate result, the reel motor 21 is so controlled in rotational speed that the tape 10 is caused to travel at a speed such that the period of the control signal reproduced therefrom becomes the operational point period T2.

At the time of reverse direction high-speed search reproduction, the idler 20 is in contact with the reel disc 11, and a low-level signal is applied to the terminal 28 of the motor drive amplifier 27. The reel motor 21 thereby starts to rotate in the reverse direction. The reel disc 11 is thereby rotated in the counterclockwise direction and takes up the tape 10, which is thereby driven and travels. Similarly as in the case of the above described forward direction high-speed search reproduction, the rotation of the reel motor 21 is so controlled that the period of the control signal reproduced from the tape 10 becomes constantly equal to the operational point period T2.

A video signal is reproduced by the video heads of the guide drum 14 from the tape 10 driven to travel at a constant high speed in this manner and reproduces a picture on a television receiver. The operator searches for the desired picture as he views this high-speed reproduced picture. Then, when the tape 10 has traveled to the position at which the desired picture is obtainable, the operator stops the travel of the tape 10 and completes the high-speed search reproduction.

Thus, by the operation of the circuit of the present invention, the period (or frequency) of the control signal reproduced from the traveling tape 10 is detected, and, in response to this detected period, the rotational speed of the reel motor 21 (i.e., the reel on the side taking up the tape) is so controlled that the traveling speed of the tape 10 becomes constant. For this reason, even when the diameter of the tape roll on the reel varies as the tape travel proceeds, the tape 10 can be driven by the reel to travel always at a constant speed. Therefore, an excellent reproduced picture is obtained for carrying out high-speed search reproduction.

In the case where there is an unused part of no recorded signal in a single magnetic tape, for example, between one recorded program and another recorded program, not only the video signal but also the control signal are not recorded in this unrecorded part. Consequently, when this unrecorded part is reached during high-speed search reproduction, a control signal is not reproduced from the control head 16. As a consequence, the output voltage of the F/V converter 24 becomes the maximum voltage V1, and the reel motor 21 is caused to rotate at high speed. Therefore, at the part of no recorded signal, the tape 10 is driven to travel at a speed higher than the regular speed for high-speed search reproduction, and the waste reproduction time at this part of no recorded signal is shortened.

It is to be noted that the recorded information signal is not limited to a video signal but may be any other information signal.

Further, this invention is not limited to these embodiments but various variations and modifications may be made without departing from the scope of the invention.

What is claimed is:

1. A high-speed tape transport system for a magnetic reproducing apparatus, said magnetic reproducing apparatus having a reel for taking up a magnetic tape on which an information signal and a control signal have been recorded, tape transport means including a capstan and a pinch roller for transporting the magnetic tape, and means for reproducing the information signal from the magnetic tape, said tape transport means being made inoperative during a mode of said reproducing apparatus in which the magnetic tape travels at a constant high speed, said high-speed tape transport system comprising:

control signal sensing means for reproducing the control signal from the magnetic tape and producing a speed signal having a frequency indicative of the tape traveling speed;

frequency-to-voltage converter means for producing a voltage in response to the frequency of the control signal from said control signal sensing means, the amplitude of the produced voltage continuously changing according to frequency changes in the control signal;

a reel motor for driving the reel at a rotational speed; and reel motor speed control means for variably controlling the rotational speed of the reel motor in response to the voltage produced by the frequency-to-voltage converter means, said rotational speed of said reel motor being controlled by said reel motor speed control, so that the magnetic tape travels at the constant high speed, the constant high speed being higher than a tape traveling speed with which said information signal and said control signal are recorded on the magnetic tape during a recording mode of said reproducing apparatus.

2. A high-speed tape transport system as claimed in claim 1 in which the reel motor is controlled to rotate at a rotational speed wherein the magnetic tape travels at a constant speed and said constant speed is of the order of approximately ten times the tape traveling speed at which said information signal is ordinarily reproduced.

3. A high-speed tape transport system as claimed in claim 1, wherein said magnetic reproducing apparatus defines an operational mode for high-speed reproduction and an operational mode for other activites and wherein said tape transport system further comprises voltage switching means for operating only when said reproducing apparatus is in said operational mode for other activities and for cutting off an output transmitting path of the frequency-to-voltage converter means and applying a voltage to the reel motor speed control means.

4. A high-speed tape transport system as claimed in claim 1 wherein said reel is a take-up reel and said magnetic reproducing apparatus further includes a supply reel for supplying the magnetic tape, wherein said tape transport system further comprises switching means for selectively switching and transmitting the rotational driving power of the reel motor to either the take-up reel or the supply reel, the switching means carrying out the switching operation by transmitting the driving power to the take-up reel when said reproducing apparatus is in a forward direction high-speed reproduction mode and transmitting the driving power to the supply reel when said reproducing apparatus is in a reverse direction high-speed reproduction mode.

5. A high-speed tape transport system as claimed in claim 1 in which the frequency-to-voltage converter means produces a maximum voltage when said control signal sensing means fails to sense a control signal recorded on the magnetic tape and said control signal sensing means fails to produce said speed signal, whereby the reel motor rotates at a rotational speed higher than the constant high speed ocurring when said reproducing apparatus is in a high-speed reproduction mode.

6. A high-speed tape transport system as claimed in claim 1 in which said frequency-to-voltage converter means produces a voltage having an amplitude inversely related to the frequency of said reproduced control signal.

* * * * *